United States Patent Office 2,727,691
Patented Dec. 20, 1955

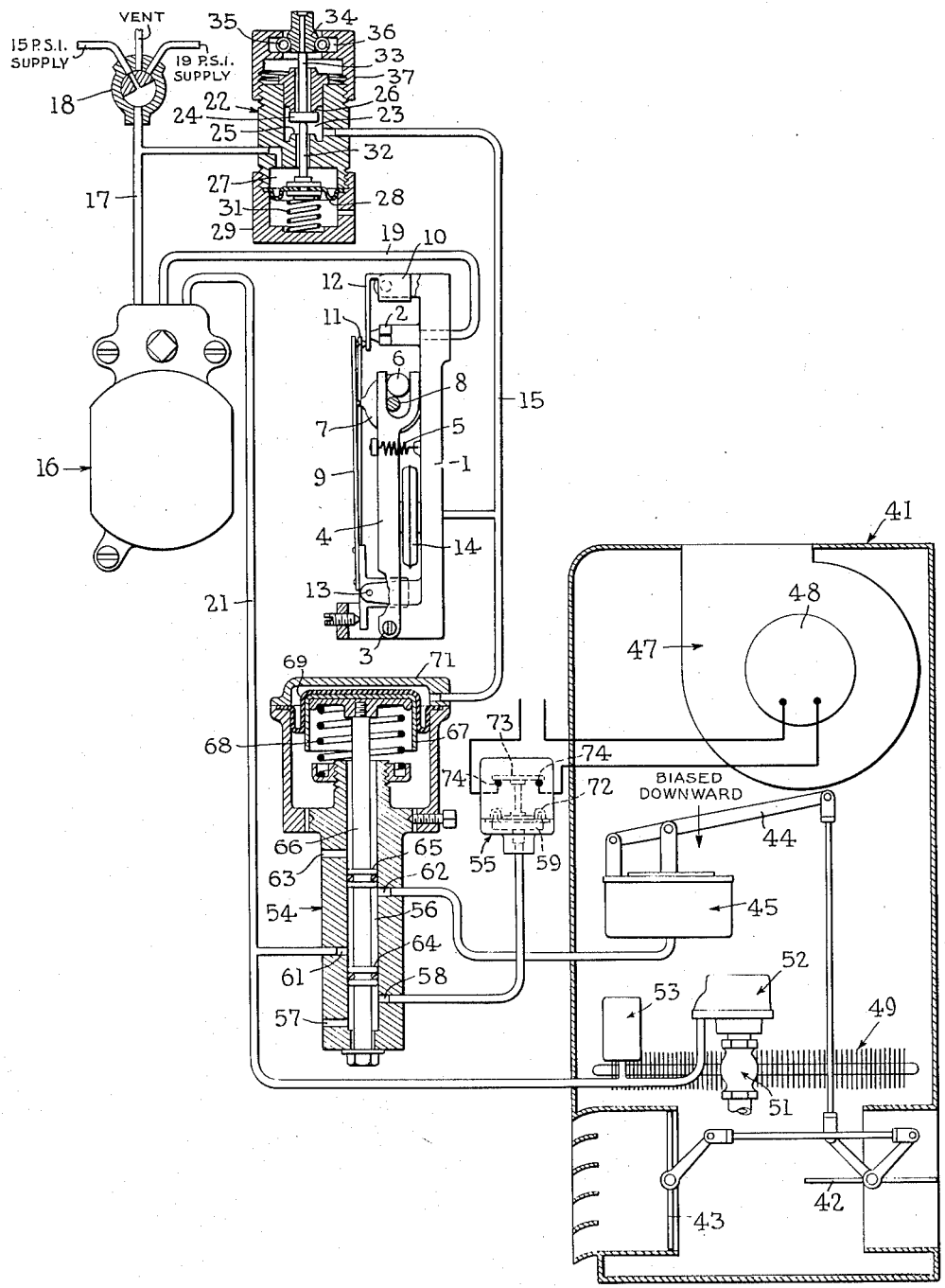

2,727,691

TWO-TEMPERATURE CONTROL FOR UNIT VENTILATORS

Harold W. Alyea, Waukesha, and Otto Scharpf, Milwaukee, Wis., assignors to Johnson Service Company, Milwaukee, Wis., a corporation of Wisconsin Application October 29, 1951, Serial No. 253,738

7 Claims. (Cl. 236—38)

This invention relates to temperature control systems, and particularly to such systems capable of being set by the janitor at a control station alternately to maintain relatively high and relatively low temperatures throughout a building or the like. As used to control room temperatures in large buildings the high temperature setting is put into effect on occupancy days and so will be called the "day" setting. The low temperature setting is put into effect during extended non-occupancy periods, such as nights, Sundays and holidays and will hereinafter be called the "night" setting.

Such systems are extensively used to control unit ventilators in the various rooms of schools and office buildings. A unit ventilator, as here contemplated, comprises a heating unit (commonly a radiator) associated with a housing having fresh air and recirculated air dampers, a circulating fan and controls for the dampers and fan. One or more such units are located in each room and are controlled by a room thermostat.

Prior control systems differ in detail, but speaking generally, it can be said that the accepted practice is such that in night setting the fan is shut down, the fresh air damper remains closed and the recirculation damper open. The thermostat then functions to maintain night temperature by controlling the heating unit which functions simply as a convection heater.

Provision has been made at the room thermostat to cause that thermostat to operate at day temperature while the system, as a whole, was in night setting. In commercial installations, as a rule, the ventilating functions of the unit ventilator remained suspended and the heater functioned simply as a convection heater.

The marked growth of partial night occupancy of buildings, particularly school buildings has led applicants to seek a simple and inexpensive room control unit, affording a local manipulation at a particular room thermostat which if made when the system is in night setting sets that thermostat to maintain day temperature and restores all the ventilating and heating functions of the unit ventilator or unit ventilator controlled thereby.

An added feature of the unit, is provision of means to render the effect of the local manipulation stable only so long as the night setting of the system remains unchanged. Consequently resetting of the system by the janitor at his control station at once erases all local manipulations and puts all units in step as they normally are, whereupon the selection of the system setting is a matter of choice available to the janitor at his control station.

The novelty resides in the room unit, for the main control system remains unchanged. Consequently we here describe and claim the room unit. It will be described as embodied for use in a pneumatic system of the type installed by Johnson Service Company. Its adaptability to other similar systems is recognized.

The description will refer to the accompanying drawing which is a diagrammatic view part in elevation and part in section showing the essential control elements for one room having one unit ventilator.

It will be apparent to persons skilled in the art that more than one unit ventilator can be installed in a room and can be connected for control by a single room thermostat according to the invention. Obviously any number of room units may be connected to one supply main, and all, or only some of them may be of the type now to be described.

Reduced to its essential elements the Johnson Service Company two-temperature pneumatic thermostat comprises a base 1 having a leak port nozzle 2. Hinged to base 1 at 3 is a lever 4 biased toward the base by spring 5. The end of the lever is slotted and straddles lug 6 on selector cam 7 rotatably mounted on base 1 at 8.

The lever is shown in its inward or day temperature position to which it is drawn by spring 5 and in which it positions cam 7 to hold the bimetallic thermostatic bar 9 out in its inactive position and allows the other bar 11 to coact with lid 12. The bars 9 and 11 are hinged at 13 and biased by weights to different adjusted positions corresponding to desired night and day temperatures. Bar 9 is the night or low temperature bar and 11 is the day bar shown in active position in the drawing.

According to the position of cam 7, the night bar 9 is either held back in inactive position, or is freed to engage lid 12 and cause it to close leak port 2. Since closure of the leak port shuts off the heat, bar 9, if free to act will always act before bar 11 (adjusted to maintain a higher temperature) can act. Thus control of bar 9 effects a selection between bars 9 and 11. Lid 12 is in effect a flap valve hinged on frame 1 and biased in an opening direction by weight 10.

The lever 4 may be forced outward by bellows motor 14 which is subject to pressure in line 15. The size of motor 14 and the strength of spring 5 are coordinated; and for discussion it will be assumed that when pressure in pipe 15 is 15 p. s. i. or less the spring prevails and the day bar 11 is allowed to take control, as shown. When pipe 15 is at higher pressure, say 19 p. s. i. the motor 14 prevails and the night bar 9 is free to act and serves to close the leak port 12 at a lower temperature than can bar 11.

The numeral 16 represents a pneumatic relay common in the art. Such a relay is shown in the patent to Otto 1,500,260, July 8, 1924. The relay is supplied with air by main line 17 which is fed selectively at two different pressures, here assumed to be 15 p. s. i. and 19 p. s. i. by a three-position switch valve 18. The third position (the middle position) is not an operating position, but is used on occasion to vent line 17 for a purpose hereinafter explained.

The valve 18 is the janitor's switch valve and is shifted to change the system from night setting to day setting. The main line 17 fed by valve 18 supplies air to all the control units of a system, only one such unit being shown in the drawing.

Air from line 17 is fed through a restriction to a pilot chamber in the relay and this chamber is vented through line 19 and leak port 2. Since the leak port 2 is variably throttled the pilot chamber pressure varies. The relay responds to the pilot chamber pressure and establishes a related pressure in branch line 21. How it does this is not a feature of the invention, but the patented relay above-identified contains a pressure-operated admission and exhaust valve which responds to variations of pilot chamber pressure and moves in one direction from a neutral (closed) position to admit air from line 17 to branch line 21 and in the other direction therefrom to exhaust air to atmosphere from branch line 21.

If it be assumed that line 15 is connected to line 17, as normally it is, the thermostat and relay arrangement so far described would conform to known commercial practice.

Lines 15 and 17 are connected, but the connection is through a novel valve, which is an important feature of the present invention. The body of the valve appears at 22 and encloses a chamber 23 in which a double-beat valve 24 is shiftable to close selectively against an inlet seat 25 and an exhaust seat 26. A branch of line 17 leads to chamber 27 at the lower end of housing 22 and from this chamber an inlet port leads to seat 25.

The lower side of chamber 27 is closed by a flexible diaphragm 28 sealed at its margin to body 22 by a cap 29, which is vented so that the lower side of the diaphragm is subject to atmospheric pressure. A biasing spring 31 reacting between the cap and diaphragm urges the diaphragm upward. A stem 32 is connected to the center of diaphragm 28 and extends through seat 25 into chamber 23. In the lower position of the diaphragm it allows valve 24 to close against inlet seat 25 and in the upper position of the diaphragm it holds valve 24 against exhaust seat 26.

Valve 24 is mounted on the lower end of a stem 33 which extends through exhaust seat 26 and terminates in a combined actuating button and reversing quick throw head 34. A garter spring 35 confined in an annular notch 36 in cap 37 coacts with head 34 to urge valve 24 toward whichever one of seats 25 or 26 it then engages.

Spring 31 is so chosen that it will be over-powered by 19 p. s. i. but not by 15 p. s. i. acting on diaphragm 28.

It follows that when day pressure (15 p. s. i.) is on line 17, button 34 will be restored to its upper position immediately if pressed and released. However if pressed when night pressure (19 p. s. i.) is on line 17 the button will not be so restored. The effect is to disconnect line 15 from main supply line 17 and continuously vent line 15. Venting of line 15 renders the day bar 11 active.

If pressure in line 17 is later reduced to or below 15 p. s. i. button 34 will be restored so that lines 15 and 17 are reconnected.

A conventional unit ventilator is indicated by the numeral 41 applied to its housing. It has a fresh air inlet controlled by damper 42 and a recirculated air inlet controlled by damper 43. These are reversely linked together as clearly shown, so that each opens as the other closes. They are operatively connected to the actuating arm 44 of bellows motor 45. A legend indicates that arm 44 is biased downward so that venting of motor 45 closes the fresh air and opens the recirculated air damper.

A fan 47 in housing 41 is driven by an electric motor 48 and serves to discharge air from the interior of the housing into the room.

A steam or other heating radiator is shown at 49. It is controlled by valve 51 which is spring biased in an opening direction as is usual and may be closed by air pressure acting in motor 52 which is directly connected with branch line 21. Low limit thermostat 53 is provided to vent line 21 and open valve 51 at any time temperature in housing 41 falls below a safe value. Thermostat 53 is not functionally related to the invention and is illustrated merely to indicate compatability.

A pressure-actuated change-over valve is generally indicated at 54 and a pressure-motor-actuated switch at 55. The drawing, being a diagram, shows these as if external to housing 41, but they can be and desirably would be mounted in the housing 41.

The valve 54 has a cylindrical valve chamber 56 with an atmospheric port 57, a port 58 leading to the motor 59 of switch 55, a port 61 connected with branch line 21, a port 62 connected to damper-motor 45, and a second atmospheric port 63.

Reciprocable in chamber 56 are two valve pistons 64 and 65 which are fixed on rod 66 and carry sealing rings, shown as the familiar "O-rings." In the illustrated upper position of the rod 66, damper-motor 45 is connected with branch line 21, and switch motor 59 is vented. In the lower position of rod 66 damper-motor 45 is vented, closing the fresh air damper and switch motor 59 is connected with branch line 21.

Rod 66 carries at its upper end a head 67 which is biased upward by coil compression spring 68. A diaphragm 69, clamped at its margin between the housing of valve 54 and cap 71, is subject to the pressure in line 15 and under that pressure reacts downward on head 67. A pressure of 15 p. s. i. or less will not over-power spring 68 but a pressure of 19 p. s. i. will move the head 67 and rod 66, full stroke downward.

The motor 59 or switch 55 is shown as including a diaphragm 72 which is weight loaded or otherwise biased downward so as to cause contactor 73 to close against contacts 74 and energize motor 48. The loading of the switch motor is coordinated with the loading of valve motor 52, so that in night setting when switch motor 59 is connected with branch line 21 fan 47 will start to run after valve 51 has opened at least partially in response to falling branch line pressure. In other settings the fan runs constantly.

Operation

*Day setting.*—Valve 18 supplies air at 15 p. s. i. to line 17. Valve 24 closes against its exhaust seat. The day bar 11 is in control because night bar 9 is held back. The valve stem 66 is in its upper position. Hence, switch 55 closes and motor 48 runs continuously. The dampers 42, 43 and valve 51 move proportionately to changes of pressure in branch line 21 which pressure varies with room temperature.

*Night setting.*—Valve 18 supplies air at 19 p. s. i. to line 17. Valve 24 remains closed against its exhaust seat, but diaphragm 28 is moved down or at least loaded until spring 31 is neutralized. The night bar is allowed to move to its operative position so that it takes control. Rod 66 moves down venting damper motor 45 to close the fresh air damper. Motor 59 of the pressure switch is connected with line 21 so that motor 48 runs fan 47 when radiator valve 51 is open.

*Local day setting when system as a whole is in night setting.*—If it is desired to heat a room to day temperature and restore the ventilating functions for that room while the system as a whole remains in night setting the button 34 in the room in question is pressed and stays in. This vents line 15 which has the effects of restoring day bar 11 to control and causing valve rod 66 to rise, so that the pressure switch closes and damper motor 45 is connected to branch line 21. As a consequence the unit or units in this room operate under day conditions in all respects.

*Reset of units which have been locally set for day temperature.*—When the building has been completely vacated, say toward mid-night, the janitor shifts valve 18 to venting position and allows pressure in line 17 to fall quickly to or below 15 p. s. i. As a consequence springs 31 reset all the buttons 35 and valves 24. Thereupon the janitor may set valve 18 to night position, charging line 17 to 19 p. s. i. and again setting the entire system to operate on the night cycle.

General considerations

To simplify explanation line pressures of 15 p. s. i. and 19 p. s. i. have been stated by way of example. These are chosen because they conform to commercial practice in Johnson Service two-temperature pneumatic thermostat installations. Any two appropriate and sufficiently differentiated pressures can be used provided springs 5 31, 68, and the loading of motors 45, 52 and 59 be properly coordinated.

The changeover valve 54 is shifted full stroke in response to the change between day and night pressures, and simply connects the damper motor and the pressure switch selectively to the branch line, venting each when disconnected. When vented the switch closes and runs the fan motor continuously (day operation). When connected to the branch line it runs the fan when branch line pressure opens the radiator valve 51 to the appropriate extent. This feature permits all heating surface for any room to be located in the unit ventilator, for the operation of the fan ensures its effectiveness under night setting. Without fan operation it would be only partially effective.

The invention affords push-button setting at or near the thermostat (at the choice of the designer) and requires only one added line (15) from the thermostat to the unit ventilator. This can readily be associated with the branch line 21.

What is claimed is:

1. The combination of a supply line for air under pressure; means operable to maintain said line at either of two predetermined supply air pressures; a pneumatic thermostat supplied with air by said line and having a branch line in which the thermostat maintains a derived pressure which is a function of the temperature to which the thermostat responds; changeover motor means subject to supply line pressure and arranged to shift in response to changes between said predetermined pressures; means operable by said changeover motor means to change the control point of the thermostat and thus condition it to maintain one or another predetermined temperature; heating means having a controller connected with said branch line; ventilating means including at least two controllers; and a valve shiftable by said changeover motor means between two positions in which selectively it connects one or the other of said ventilating controllers with said branch line.

2. The combination of a supply line for air under pressure; means operable to maintain said line at either of two predetermined supply air pressures; a pneumatic thermostat supplied with air by said line and having a branch line in which the thermostat maintains a derived pressure which is a function of the temperature to which the thermostat responds; changeover motor means normally subject to supply line pressure and arranged to shift in response to changes between said predetermined pressures; means operable by said changeover motor means to change the control point of the thermostat and thus condition it to maintain one or another predetermined temperature; heating means having a controller connected with said branch line; ventilating means including at least two controllers; a valve shiftable by said changeover motor means between two positions in which selectively it connects one or the other of said ventilating controllers with said branch line; and valve means normally biased to a connecting position, subject to control of bias by supply air pressure and conditioned when one of said predetermined supply air pressures is in effect to be manually shiftable to, and when so shifted to remain in a position in which it disconnects and vents said change-over motor while said one supply pressure remains in effect.

3. The combination defined in claim 2 in which the last named valve means comprises a stop-and-waste valve interposed between said supply line and said changeover motor means; reversing biasing means for impositively retaining said valve in whichever of its two functional positions (stop-and-waste or supply) it may occupy; dominant spring means for engaging said valve and urging it to supply position; pressure operated means subject to supply line pressure and effective when this is at the higher predetermined pressure to suppress the action of said dominant spring means; and manually operable means for shifting said valve to stop-and-waste position.

4. The combination defined in claim 2 in which the last named valve means comprises a stop-and-waste valve interposed between said supply line and said changeover motor means; reversing biasing means for impositively retaining said valve in whichever of its two functional positions (stop-and-waste or supply) it may occupy; dominant spring means for engaging said valve and urging it to supply position; pressure operated means subject to supply line pressure and effective when this is at the higher predetermined pressure to suppress the action of said dominant spring means; and manually operable means for shifting said valve to stop-and-waste position and the means operable to maintain the supply line pressures includes means operable temporarily to vent said line.

5. The combination defined in claim 2 in which the ventilating means comprises an electric-motor-driven fan controlled by a pressure-operated switch biased to close, and interconnected fresh air and recirculated air dampers controlled by a pressure operated damper motor biased to close the fresh and open the recirculated air damper.

6. The combination of a supply line for air under pressure; means operable to maintain said line at either of two predetermined air-supply pressures; a pneumatic thermostat supplied with air by said line and having a branch line in which the thermostat maintains a derived pressure which is a function of the temperature to which the thermostat responds; two changeover motor means both subject to supply-line pressure and both arranged to shift in response to change between said predetermined pressures, the first of said motor means being located at the thermostat; means operable by the first of said changeover motor means to change the control point of the thermostat and thus condition it to maintain one or another predetermined temperature; a unit ventilator comprising, a heater having a pressure-operated controller connected with said branch line, an electric-motor-driven fan having a pressure operated control switch biased to close, an enclosing casing and reversely acting fresh and recirculated air damper mechanism for permitting air to pass through the casing and fan in heat-exchange relation with said heater, said damper mechanism including a pressure-operated damper motor biased to close the fresh and open the return air damper; and a changeover valve arranged to be shifted by the second changeover motor means between two positions in which respectively it connects the pressure operated switch and the damper motor selectively with said branch line while venting the one of them not so connected.

7. The combination of a supply line for air under pressure; means operable to maintain said line at either of two predetermined air-supply pressures; a pneumatic thermostat supplied with air by said line and having a branch line in which the thermostat maintains a derived pressure which is a function of the temperature to which the thermostat responds; two changeover motor means both normally subject to supply-line pressure and both arranged to shift in response to changes between said predetermined pressures, the first of said motor means being located at the thermostat; means operable by the first of said changeover motor means to change the control point of the thermostat and thus condition it to maintain one or another predetermined temperature; a unit ventilator comprising, a heater having a pressure-operated controller connected with said branch line, an electric-motor-driven fan having a pressure operated control switch biased to close, an enclosing casing and reversely acting fresh and recirculated air damper mechanism for permitting air to pass through the casing and fan in heat-exchange relation with said heater, said damper mechanism including a pressure-operated damper motor biased to close the fresh and open the return air damper; a changeover valve arranged to be shifted by the second changeover motor means between two positions in which respectively it connects the pressure operated switch and the damper motor selectively with said branch line while venting the one of them not so connected; and valve means normally biased to a connecting position, subject to control of bias by air-supply pressure and conditioned when the higher of said predetermined air-supply pressures is in effect to be manually shiftable to, and when so shifted to remain in a position to disconnect both change-over motor means from the supply line and vent them while said higher air-supply pressure remains in effect.

References Cited in the file of this patent

UNITED STATES PATENTS

| | | |
|---|---|---|
| 1,597,352 | Fortier | Aug. 24, 1926 |
| 2,216,551 | Ewald | Oct. 1, 1940 |
| 2,334,445 | Seelbach, Jr. | Nov. 16, 1943 |
| 2,377,227 | Giswold | May 29, 1945 |